United States Patent [19]

Deleens et al.

[11] 4,208,493

[45] Jun. 17, 1980

[54] PROCESS FOR CONTINUOUS SYNTHESIS OF POLY (ETHER-ESTER-AMIDE) SEQUENCE COPOLYCONDENSATES

[75] Inventors: Gérard Deleens, Bernay; Ferlampin Jacques, Saulx les Chartreux; Claude Poulain, Rosay, all of France

[73] Assignee: ATO Chimie, Paris, France

[21] Appl. No.: 973,885

[22] Filed: Dec. 28, 1978

[30] Foreign Application Priority Data

Dec. 30, 1977 [FR] France .................................. 77 39790

[51] Int. Cl.$^2$ .............................................. C08G 69/48
[52] U.S. Cl. .................................... 525/420; 525/419; 528/292; 528/301; 528/323
[58] Field of Search ................ 528/292, 301; 525/419, 525/420

[56] References Cited

U.S. PATENT DOCUMENTS

| | | | |
|---|---|---|---|
| 2,997,462 | 8/1961 | Wulff et al. ........................... | 528/292 |
| 3,363,027 | 1/1968 | Schnegg et al. ...................... | 528/311 |
| 3,660,356 | 5/1972 | Radlmann et al. ................... | 528/292 |

*Primary Examiner*—Harold D. Anderson
*Attorney, Agent, or Firm*—Burgess, Ryan and Wayne

[57] ABSTRACT

A process to synthesize poly (ether-ester-amide) sequence copolycondensates by the reaction in a molten condition between a dicarboxylic polyamide, in which the carboxylic functions are located at the chain-ends, and a polyoxyalkoylene with hydroxylated chain-ends, in the presence of a catalyst.

This reaction is performed continuously in a thin-film reaction space through which the reaction mixture passes continuously under turbulent flow conditions.

This process, which involves much shorter reaction times, produces sequence copolycondensates with better mechanical properties than corresponding substances obtained by batch processes.

17 Claims, No Drawings

PROCESS FOR CONTINUOUS SYNTHESIS OF POLY (ETHER-ESTER-AMIDE) SEQUENCE COPOLYCONDENSATES

This invention concerns the production of poly (ether-ester-amide) sequence copolycondensates, and more specifically, a process for the continuous synthesis of these copolycondensates.

Poly (ether-ester-amide) sequence copolycondensates can be produced for use, among other things, in compositions for moulding, extrusion or drawing, by means of a reaction, in a state of fusion, in the presence of a catalyst and in a vacuum of variable intensity, between a dicarboxylic polyamide, the carboxylic functions of which are located at the chain-ends, and a polyoxyalkylene glycol with hydroxylated chain-ends.

The resulting sequence copolycondensates contain chains consisting of recurrent units with the formula:

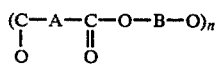

where:
- A is the polyamide sequence resulting from the loss of two carboxylic functions from the dicarboxylic polyamide,
- B is the polyoxyalkylene glycol sequence resulting from the loss of the two hydroxylated groups at the chain-ends of the polyoxyalkylene glycol, and
- n is the number of recurrent units forming the sequence copolycondensate chain.

In existing processes, the reaction between the dicarboxylic polyamide and the polyoxyalkylene glycol is performed intermittently, and although poly (ether-ester-amide) sequence polycondensates with high molecular weights can be obtained, suitable for moulding, extrusion or drawing, there are certain drawbacks in the intermittent nature of the process. In particular, conditions are not so favourable for heat and material exchanges, and this can result in certain disturbances in copolycondensation reaction kinetics. Furthermore, contact times among reagents have to be fairly long, usually several hours, in order to obtain products with effective properties, and this tends to increase thermal deterioration of the sequence copolycondensate.

This invention offers a process for producing poly (ether-ester-amide) sequence copolycondensates, based on the same reactive formula, but which is carried out continuously in a specific way that overcomes the drawbacks of other existing processes.

This new process to synthesize poly (ether-ester-amide) sequence copolycondensates by the reaction between a dicarboxylic polyamide, the carboxylic functions of which are located at the chain-ends, and a polyoxyalkylene glycol with hydroxylated chain-ends, in the presence of a catalyst and in a reaction zone comprising a reagent inlet and a reaction product outlet connected by a reaction space, the temperature of which is high enough to keep the reaction mixture molten, is characterized by the fact that the reaction space is the thin-film reaction space between the stator and rotor of at least one thin-film reactor of the stator/rotor type, and that the reaction mixture is made to circulate continuously inside the thin-film reaction space by making the rotor revolve at a speed of at least 200 rpm.

A thin-film reactor of the stator/rotor type comprises, in diagrammatical form, a fixed hollow part known as the stator, inside which is located a mobile part, known as the rotor, which revolves inside the stator, in such a way that these fixed and moving parts leave a thin space between them, known as the "thin-film reaction space", similar to the annular space between two surface of revolution, the outer one consisting of the inside surface of the stator and the inner one consisting of the surface formed by the rotation of the rotor end.

The thickness of this thin-film reaction space, which is the same as the thickness of reaction mixture circulating inside it, is not more than 3 centimetres, and preferably between 0.4 and 15 millimeters.

The reaction space inside which the copolycondensation reaction is performed may be a single thin-film reaction space, where a single stator/rotor thin-film reactor is used, or it may comprise a series of basic thin-film reaction spaces, where a number of stator/rotor thin-film reactors are arranged in series, this latter method being preferable for the production of sequence copolycondensates with high molecular weight.

The speed of rotation of the single thin-film reactor rotor, or of each of the series of thin-film reactors, which must be at least 200 rpm, can vary considerably above this minimum. It is preferably between 230 and 2,000 rpm, and more specifically between 250 and 1,500 rpm.

Suitable thin-film reactors for this new process include a cylindrical, conical or truncated conical reactor comprising a cylindrical, conical or truncated conical fixed outer tube, performing the function of stator, inside which revolves a rotor, positioned on the same axis as the stator and slightly smaller in diameter, matching the stator in shape and consisting of a cylinder, a cone or a truncated cone, as the case may be, the circumference of which carries components designed to move the reactive mixture from the reaction space inlet to the outlet, such as one or more spiral threads, or a shaft with blades, arranged in such a way that, when the rotor revolves, these blades keep the thin film of reactive mixture inside the space between the inner surface of the stator and the surface formed by the revolving blades, as well as helping to move the mixture under turbulent flow conditions from the inlet to the outlet.

In this type of reactor, the reactive mixture entering the reaction space inlet is spread out in a thin film, under the effect of the high-speed revolving rotor, against the stator wall in the form of a thin layer which moves under turbulent flow conditions from the inlet to the outlet. As already mentioned, the thickness of the annular space between stator and rotor, which depends on the reactor dimensions, is usually not more than 3 centimeters, and preferably between 0.4 and 15 millimeters.

If the space between the stator and the rotor is kept as small as possible and the rotor is made to revolve at a suitable speed within the range stipulated above, high speed-gradients can be created inside the thin-film reaction space, producing a considerable reduction in the viscosity of the reaction mixture and consequently helping to make it flow more easily. The speed gradient ($s^{-1}$ or seconds$^{-1}$) is the ratio of the average linear speed at the perimeter of the rotor, expressed in units of length per second, to the average distance between rotor and stator, in other words the average thickness of the reaction space or thin film of reaction mixture, expressed in the same unit of length. The average linear speed of the rotor perimeter means either the linear velocity of any point on the rotor perimeter when the rotor is cylindrical or describes a cylindrical surface of revolution when in rotation, or the linear velocity of a point half-way between the point on the rotor perimeter farthest from the rotor axis and the point on the rotor perimeter closest to this axis, when the rotor is not cylindrical, but consists for example of a cone or truncated cone, or describes a non-cylindrical surface of revolution. For the copolycondensation reaction in this new process, speed gradients of more than 100 s$^{-1}$ are recommended, and more specifically those between 500 s$^{-1}$ and 500,000 s$^{-1}$.

The reaction mixture inside the single thin-layer reaction space or each of the basic reaction spaces, when several such spaces are used in a series, is kept at a suitable temperature for the copolycondensation reaction by indirect heat exchange with a heat-regulation fluid, which may circulate in contact with the outside surface of the reaction space. More specifically, the reaction space is kept at a suitable temperature by heat-regulation fluids circulating inside the stator or rotor, or inside both the stator and rotor of the thin-film reactor.

The working pressure inside the single thin-film reaction space or each of the basic thin-film reaction spaces may range from atmospheric pressure or close to it to a vacuum of up to 0.05 torr, as required.

When the copolycondensation reaction is carried out in a series of basic thin-film reaction spaces, operating conditions, in particular temperature, pressure or vacuum, and speed gradient, may be identical or different inside the different reaction spaces. The vacuum in a series of successive basic thin-film reaction spaces may increase from one space to another. For example, the first basic reaction space may work at between about 10 torrs and about atmospheric pressure, while the last basic reaction space is working at a vacuum of 0.05 to 0.5 torr, and preferably about 0.1 torr.

In addition, when a series of basic thin-film reaction spaces are used, in which each space consists of the annular space between a stator and a rotor, it is preferable for the speed gradient inside the reaction space corresponding to the final phase of the copolycondensation reaction, where the reaction mixture become fairly viscous, to be only a fraction of the speed gradient created in the reaction space preceding it, for example between one third and one tenth of it. This reduces self-overheating, which would result from contact between the viscous reaction mixture and the rotor revolving at an excessive speed.

The duration of the copolycondensation reaction, corresponding to the time taken to pass through the single thin-film reaction space when only one space is used or through all the basic thin-film reaction spaces when a series of such spaces is used, may vary considerably. However, it should not exceed one hour, and is preferably between a few minutes and half an hour.

The reagents, namely dicarboxylic polyamide and dihydroxylated polyoxyalkylene glycolene glycol, and the catalyst may be fed separately and continuously into the single thin-film space inlet or the inlet to the first reaction space when a series of such spaces is used. However, it is preferable to premix reagents and catalyst outside the reaction space, for example in a static mixer, in order to produce a homogeneous mixture at a temperature close to the reaction temperature, then to feed this premixture, which takes the form of a molten mass, continuously into the single thin-film reaction space inlet or the inlet to the first basic reaction space when a series of such spaces is used. The poly (ether-ester-amide) sequence copolycondensate resulting from the polycondensation reaction is discharged continuously from the single thin-film reaction space outlet or the outlet from the last reaction space when a series of such spaces is used.

In this new process, the catalyst may be any existing catalyst used in the art to encourage a copolycondensation reaction between a dicarboxylic polyamide and dihydroxylated polyoxyalkylene glycol. More specifically, it may consist of one or more tetra-alkoxides with the formula:

M (OR)$_4$, where:
M is a metal such as titanium, zirconium or hafnium, and
R is an alkyl radical containing between 1 and 24, and preferably between 1 and 8 carbon atoms.

The catalyst may also be obtained by combining one or more tetra-alkoxides with one or more alkaline or alkaline-earth alcoholates with the formula:

(R$_1$O)$_p$Y, where:
R$_1$ is a hydrocarbon radical, notably an alkyl radical containing between 1 and 24, and preferably 1 and 8 carbon atoms,
Y is an alkaline or alkaline-earth metal, and
p is the valency of Y.

The quantities of alkaline or alkaline-earth alcoholate and titanium, zirconium or hafnium tetra-alkoxide used to form the mixed catalyst can vary widely. It is preferable, however, to use quantities of alcoholate or tetra-alkoxide that will provide a molar proportion of alcoholate approximately equal to the molar proportion of tetra-alkoxide.

The percentage weight of catalyst, in other words of tetra-alkoxide or tetra-alkoxides when the catalyst does not contain any alkaline or alkaline-earth alcoholate, or of both tetra-alkoxide or tetra-alkoxides and alkaline or alkaline-earth alcoholate or alcoholates when the catalyst combines both types of compounds, ranges from 0.01 to 5% of the weight of dicarboxylic polyamide and polyoxyalkylene glycol mixture, and is preferably between 0.05 and 2%.

Dicarboxylic polyamides, in which the carboxylic functions are fixed to the polyamide chain-ends, are obtained by processes known in the previous art, for example by polycondensation of one or more lactams and/or one or more amino acids, or by polycondensation of a dicarboxylic acid with a diamine, in the presence of an excess of an organic dicarboxylic acid in which the carboxylic functions are preferably fixed to each end of the molecule. During the polycondensation reaction, these dicarboxylic acids fix themselves as components of the macromolecular polyamide chain, particularly at the chain-ends, resulting in a dicarboxylic α-ω-polyamide. In addition, the dicarboxylic acid acts as a chain limiter, and this is why an excess of this diacid is used in relation to the quantity needed to produce the dicarboxylic polyamide, and the amount of excess diacid allows the length of the macromolecular chain to be determined, and consequently the average molecular weight of the dicarboxylic polyamide.

The polyamide can be obtained from lactams and/or amino acids in which the hydrocarbon chain contains between 4 and 14 carbon atoms, such as caprolactam, oenantholactam, dodecalactam, undecanolactam, decanolactam, 11 aminoundecanoic acid, and 12 aminododecanoic acid.

Polyamides obtained by polycondensation of dicarboxylic acids with a diamine include, without being restricted to, condensation products of hexamethylene diamine, with adipic, azelaic, sebacic and 1,12-dodecanedioic acid, referred to as 6.6, 6.9, 6.10 and 6.12 nylons respectively, as well as the condensation product of nonamethylene diamine with adipic acid, referred to as 9.6 nylon.

Dicarboxylic acids used in the reaction to synthesize dicarboxylic polyamide, partly to allow a carboxylic group to be fixed to each polyamide chain-end, and partly as chain limiter, comprise dicarboxylic acids containing 4 to 20 carbon atoms, particularly alkanedioic acids such as succinic, adipic, suberic, azelaic, sebacic, undecanodioic and dodecanedioic acids, or cycloaliphatic or aromatic dicarboxylic acids such as terephthalic, isophthalic, cyclohexane-1, 4-dicarboxylic acids. An excess of these acids is used, in the proportion needed to produce a polyamide with the required molecular weight, on the basis of standard calculations for polycondensation techniques.

Average molecular weights of dicarboxylic polyamides can vary quite widely, between 300 and 15,000, and preferably between 800 and 5,000.

Polyoxyalkylene glycols with hydroxylated end groups belong to the group comprising linear or branch polyoxyalkylene glycols in which the alkylene radical contains at least 2 carbon atoms, such as polyoxyethylene glycol, polyoxypropylene glycol, polyoxytetramethylene glycol, copolymers derived from these polyoxyalkylene glycols, and mixtures of these polyoxyalkylene glycols and/or their copolymers.

The average molecular weights of these polyoxyalkylene glycols with hydroxylated end groups can vary widely, between 100 and 6,000, and preferably between 200 and 3,000.

The percentage weight of polyoxyalkylene glycol compared with the total weight of polyoxyalkylene glycol and dicarboxylic polyamide which reacts to form the poly (ether-ester-amide) can range from 5 to 85%, and is preferably between 10 and 50%.

The polycondensation reaction between dicarboxylic polyamide and dihydroxylated polyoxyalkylene glycol to form the sequence poly (ether-ester-amide) is performed by bringing the reagents into contact in the presence of the catalyst, in a molten condition, in other words at temperatures above the melting points of dicarboxylic polyamide and polyoxyalkylene glycol, while being stirred. Temperatures for this reaction must be high enough to keep the molten reaction mixture sufficiently fluid to allow proper contact among the reagents by stirring.

These temperatures, above the melting points of dicarboxylic polyamide and dihydroxylated glycol polyoxyalkylene, may be between 100° and 400° C. and are preferably between 200° and 300° C.

As already mentioned, the copolycondensation reaction can be performed at various levels of vacuum as required, up to 0.05 torr, or in an inert atmosphere at or close to atmospheric pressure.

To ensure that the reaction takes place under conditions favourable to the production of sequence poly (ether-ester-amide), equimolarity should be respected between the carboxylic groups in the dicarboxylic polyamide and the hydroxyl groups in the polyoxyalkylene glycol reacting with each other.

Additives, such as stabilizers against the effects of light and heat, antioxidants, fireproofing and colouring agents, can be added to the polycondensate before processing operations or, if possible, during the actual polycondensation reaction to produce the sequence poly (ether-ester-amide), in order to improve the properties of the product or alter them to suit particular requirements. For example, when a series of thin-film reaction spaces is being used, various additives can be injected into the reaction mixture between two reaction spaces, allowing these additives (particularly stabilizing and colouring agents) to be dispersed satisfactorily in the mixture without requiring subsequent extrusion.

This new process, in which sequence poly (ether-ester-amide) are synthesized continuously, offers the following advantages over the batch process so far used:

the high ratio between the surface area of the reactive mixture and its volume, together with the high rate of replacement of this surface, among other reasons because of the turbulent flow conditions of the reaction mixture, ensure extremely favourable conditions for heat and material exchanges; consequently, the kinetics of the copolycondensation reaction are considerably increased and the lengths of time for which the various components of the mixture remain inside the thin-film reaction space or spaces are short enough to reduce heat deterioration phenomena;

the resulting sequence poly (ether-ester-amide) have a lower polydispersity index for the same viscosity;

higher maximum molar weights can be obtained;

products leaving the single reaction space, or last basic reaction space where a series of reactors are used, do not show any residual yellowing, which allows them to be used in the textile field;

various additives can be injected between two reaction spaces, ensuring satisfactory dispersal in the reaction mixture without requiring subsequent extrusion.

The following properties have been chosen as a basis for testing and identifying products obtained by this new process:

Vicat point in °C. (expressed in accordance with standard ASTM D 1525 65 T)

intrinsic viscosity (measured in a solution in metacresol)

tensile elongation (measured in accordance with standard ASTM D 638 67 T)

torsional modulus (measured in accordance with standard ASTM D 1043 61 T using the Clash and Berg method).

The invention is illustrated by, without being confined to, the following examples.

EXAMPLE 1

A sequence copoly (ether-ester-amide) was synthesized by reaction between a dicarboxylic polycaprolactam (or 6 dicarboxylic polyamide), with the carboxylic functions located at the chain-ends, and a polyoxytetramethylene glycol, with hydroxylated chain-ends, in the presence of titanium tetrabutoxide as catalyst.

The apparatus used for the experiment comprised three thin-film reactors A, B and C, placed in series in this order, and preceded by a static mixer to premix the reagents before they entered the first reactor in the series, reactor A.

The reactors were each a vertical reactor comprising an outer cylinder, or stator, equipped with a double casing inside which a heat-regulation fluid circulated, and a blade rotor inside the stator, on the same axis, and driven rotationally by a motor. The upper end of the reactor contained an inlet for reagents above the rotor blades and a distribution ring between this inlet and the top of the rotor, while the bottom of the reactor contained a discharge system, or outlet, for the reactive mixture containing reaction products. The inside diameter of the reactor was 150 mm, while the perimeter of the rotor carried blades slightly smaller than this in diameter. When the rotor revolved inside the stator, an annular reaction space was left inside the reactor between stator and rotor. The thickness of this space, on which the thickness of the thin film of reaction mixture depends, was between 1 and 2 mm, and its effective height approximately 1,100 mm. The first two reactors in the series, A and B, were equipped with rotors effective for low and medium viscosities, while the last reactor in the series, C, was equipped with a rotor effective for high viscosities. By "effective" rotor is meant one on which the blades are so arranged as to distribute the reaction mixture in a thin film and move it downwards towards the outlet at the bottom of the reactor under turbulent flow conditions. The reaction mixture entering the top of each reactor A, B and C was distributed evenly over the heating surface by the distribution ring, then picked up by the rotor blades, revolving at high speed, and spread instantaneously inside the reaction space in the form of a highly turbulent thin film.

The series of three reactors can therefore be represented diagrammatically as a set of three thin-film annular reaction spaces installed in series, each between 1 and 2 mm thick and approximately 1,100 mm high, and inside which the reaction mixture is distributed in the form of a thin film and moves under turbulent flow conditions.

20 kg per hour 6-dicarboxylic polyamide with an average molar weight $\overline{M}_n$ of 1,300, 10 kg per hour polyoxytetramethylene glycol with an average molar weight $\overline{M}_n$ of 650, and 60 g per hour titanium tetrabutoxide as catalyst were first mixed in a static mixer and heated to 240° C., then fed continuously into reactor A. This reactor, which had first been blown through with nitrogen, was kept at a temperature of 240° C. and contained a 15 torrs vacuum. The rotor was revolving at a speed of 1,020 rpm.

On leaving reactor A, the product was in the form of an uncoloured homogeneous mass with an intrinsic viscosity $\eta$ of 0.28 dl/g.

This product was then fed continuously into reactor B, at a temperature of 260° C. and a 1 torr vacuum. The rotor of this reactor was revolving at 1,200 rpm.

On leaving reactor B, the product was in the form of a homogeneous mass with an intrinsic viscosity $\eta$ of 0.72 dl/g. This was fed continuously into reactor C, at a temperature of 270° C. and containing an 0.1 torr vacuum. The rotor in this reactor was revolving at 300 rpm, in order to reduce self-overheating resulting from the high viscosity of the reaction mixture circulating inside this reactor as a result of rotor movements. The sequence poly (ether-ester-amide) was collected continuously at the outlet from reactor C.

The total time taken to pass through all three reactors A, B and C, in other words through the total reaction space formed by the series of three basic reaction spaces, did not exceed 20 minutes.

The sequence poly (ether-ester-amide) leaving reactor C was almost uncoloured and had an intrinsic viscosity $\eta$ of 1.55 dl/g and a polydispersity index of 2.6.

This product was injected into a press to obtain standard samples to be used for tensile tests and measurement of the torsional modulus.

The following mechanical properties were obtained from these tests:

tensile elongation:
12% at 120 kg/cm$^2$ at flow point
525% at 410 kg/cm$^2$ at breaking point
torsional modulus:
650 kg/cm$^2$ at 23° C.
Vicat point:
170° C. at 1 kg.

For purposes of comparison, a sequence copolycondensate was produced from the same reagents, using the same catalyst, by means of a batch process, at 270° C. in an 0.1 torr vacuum for 2 hours, in a conventional 6 liter stainless-steel reactor. The resulting sequence poly (ether-ester-amide) had an intrinsic viscosity $\eta$ of 1.5 dl/g and a polydispersity index of 2.9, and it showed residual yellowishness.

The product had the following mechanical properties:

tensile elongation:
11% at 110 kg/cm$^2$ at flow point
370% at 380 kg/cm$^2$ at breaking point
torsional modulus:
630 kg/cm$^2$ at 23° C.
Vicat point:
168° C. at 1 kg.

Compared with the product obtained by the batch process, the sequence poly (ether-ester-amide) obtained by this new continuous thin-film process consequently offers, for comparable intrinsic viscosity, better appearance (with negligible colouring), lower polydispersity and better mechanical properties; in addition, preparation time is much shorter.

| EXAMPLES | 2 | 3 | 4 |
|---|---|---|---|
| Polyamide oligomers | | | |
| Type | 6-dicarboxylic polyamide | 6-dicarboxylic polyamide | 11-dicarboxylic polyamide |
| Average molar weight | 2,000 | 3,500 | 2,000 |
| Flow-rate | 23 kg/h | 27,5 kg/h | 20 kg/h |
| Polyoxyalkylene glycol oligomers | | | |
| Type | dihydroxy polyoxypropylene | dihydroxy polyoxypropylene | dihydroxy polyoxyethylene |
| Average molar weight | 600 | 300 | 1 000 |

-continued

| EXAMPLES | 2 | 3 | 4 |
|---|---|---|---|
| Flow-rate | 7 kg/h | 2.4 kg/h | 10 kg/h |
| Catalyst | | | |
| Type | Zr(OC$_4$H$_9$)$_4$ | Ti(O iso C$_3$H$_7$)$_4$ | Ti(OC$_4$H$_9$)$_4$ |
| Concentration | 0.5% weight | 0.2% weight | 0.2% weight |
| Flow-rate | 150 g/hr | 60 g/hr | 60 g/hr |
| Reactor A | | | |
| Temperature | 230° C. | 240°0 C. | 240° C. |
| Pressure | 1 atm (N$_2$) | 15 torr | 15 torr |
| Rotor speed | 1,300 rpm | 1 100 rpm | 1 100 rpm |
| Intrinsic viscosity obtained | 0.2 dl/g | 0.3 dl/g | 0.25 dl/g |
| Reactor B | | | |
| Temperature | 240° C. | 260° C. | 260° C. |
| Pressure | 15 torrs | 1 torr | 1 torr |
| Rotor speed | 1 300 rpm | 1 000 rpm | 1 000 rpm |
| Intrinsic viscosity obtained | 0.65 dl/g | 0,75 dl/g | 0,65 dl/g |
| Reactor C | | | |
| Temperature | 255° C. | 270°° C. | 270° C. |
| Pressure | 0.1 torr | 0.1 torr | 0.1 torr |
| Rotor speed | 300 rpm | 300 rpm | 300 rpm |
| Intrinsic viscosity obtained | 1.3 dl/g | 1.45 dl/g | 1.5 dl/g |
| Mechanical properties | | | |
| Tensile test to | | | |
| breaking point - elongation | 480% | 580% | 480% |
| -load | 485 kg/cm$^2$ | 390 kg/cm$^2$ | 325 kg/cm$^2$ |
| Torsional modulus G at 22° C. | 880 kg/cm$^2$ | 1835 kg/cm$^2$ | 510 kg/cm$^2$ |
| Vicat point at 1 kg | 184° C. | 182° C. | 151° C. |

EXAMPLES 2 to 4

Using the same operating method and apparatus as described in Example 1, various sequence poly (ether-ester-amide) were synthesized by performing a continuous reaction with the following ingredients:

a dicarboxylic polycaprolactam (6-dicarboxylic polyamide), with the carboxylic functions at the chain-ends, and a polyoxypropylene glycol with hydroxylated chain-ends, using zirconium tetrabutoxide with the formula Zr (OC$_4$H$_9$)$_4$ as catalyst (Example 2);

a dicarboxylic polycapromactam with the carboxylic functions at the chain-ends, and a polyoxyethylene glycol with hydroxylated chain-ends, using titanium tetraisopropoxide with the formula Ti (O iso-C$_3$H$_7$)$_4$ as catalyst (Example 3);

a dicarboxylic polyundecanamide (11-dicarboxylic polyamide), with carboxylated chain-ends, and a polyoxyethylene glycol with hydroxylated chain-ends, using titanium tetrabutoxide with the formula Ti (OC$_4$H$_9$)$_4$ as catalyst (Example 4).

The Table above shows the results that were obtained.

Naturally, this invention is in no way confined to the Examples and embodiments described above; many variant forms are possible for someone skilled in the art, depending on applications, and without any departure from the spirit of the invention.

What is claimed is:

1. A process to synthesize extrudable, moldable or drawable poly (ether-ester-amide) sequence copolycondensates by the reaction between a dicarboxylic polyamide, in which the carboxylic functions are located at the chain-ends, and polyoxyalkylene glycol with hydroxylated chain-ends, in the presence of a catalyst for the copolycondensation reaction between a dicarboxylic polyamide and a dehydroxylated polyoxyalkylene glycol, operating in a reaction zone comprising a reagent inlet and a reaction product outlet connected by a reaction space, which is held at a high enough temperature to keep the reaction mixture molten, this process being characterized by the fact that the reaction space is the thin-film space left between the stator and rotor of at least one thin-film stator/rotor reactor, and by the fact that the reaction mixture is made to circulate continuously inside the thin-film reaction space by making the rotor revolve at a speed of at least 200 rpm.

2. A process as defined in claim 1, in which the thin-film reaction space comprises a number of basic thin-film reaction spaced located in series, these spaces being those left between the stator and rotor of a series of thin-film reactors.

3. A process as defined in claim 1 or 2, in which the thickness of the reaction mixture inside the single thin-film reaction space or each basic thin-film reaction space is not more than 3 cm.

4. A process as defined in claim 1 or 2, in which the speed of rotation of the rotor is between 230 and 2,000 rpm.

5. A process of claim 1 or 2, in which the thin-film reactor is cylindrical, conical or truncated conical in shape.

6. A process of claim 1 or 2, in which the ratio of the average linear velocity of the rotor to the average distance between the rotor and stator, or speed gradient, is above 100 seconds$^{-1}$.

7. A process of claim 1 or 2, in which the working pressure inside the single thin-film reaction space or each basic thin-film reaction space ranges from atmospheric pressure or close to it to a vacuum of up to 0.05 torr.

8. A process as defined in claim 2, wherein the working pressure inside each basic thin-film reaction space ranges from about atmospheric to 0.05 torr, and the vacuum inside the reaction space increases from one basic reaction space to the next.

9. A process as defined in claim 8, in which the working pressure inside the first basic thin-film reaction space ranges from approximately 10 torrs to atmospheric pressure, and inside the last basic thin-film reaction space from 0.05 to 0.5 torr.

10. A process as defined in claim 1 or 2 in which the temperature inside the single thin-film reaction space or each basic thin-film reaction space is above the melting points of the dicarboxylic polyamide and polyoxyalkylene glycol, ranging from 100° to 400° C.

11. A process as defined in claim 1 or 2, in which the polycondensation reaction does not last more than 1 hour.

12. A process as defined in claim 1 or 2, in which the dicarboxylic polyamides, polyoxyalkylene glycol and catalyst are injected continuously, in the form of a premixture at a temperature equal or close to the reaction temperature, through the inlet to the single thin-film reaction space or to first basic thin-film reaction space where the copolycondensation reaction is being performed in a series of such spaces.

13. A process as defined in claim 1 or 2 wherein the thickness of the reaction mixture inside the single thin-film reaction space or each basic thin-film reaction space is between 0.4 and 15 mm.

14. A process as defined in claim 1 or 2 wherein the speed of rotation of the rotor is between 250 and 1500 rpm.

15. A process as defined in claim 1 or 2 wherein the ratio of the average linear velocity of the rotor to the average distance between the rotor and stator, or speed gradient, is between 500 and 500,000 $s^{-1}$.

16. A process as defined in claim 1 or 2 wherein the temperature inside the single thin-film reaction space or each basic thin-film reaction space is above the melting points of the dicarboxylic polyamide and polyoxyalkylene glycol, ranging from 200° to 300° C.

17. A process as defined in claim 1 or 2 wherein the polycondensation reaction varies between a few minutes and half an hour.

* * * * *

UNITED STATES PATENT OFFICE
CERTIFICATE OF CORRECTION

Patent No. 4,208,493          Dated June 17, 1980

Inventor(s)  Gerard Deleens, et al

It is certified that error appears in the above-identified patent and that said Letters Patent are hereby corrected as shown below:

In the Title Page, the name of the 2nd inventor is reversed. It should read --Jacques Ferlampin--.

In the Abstract, line 5: "polyoxyalkoylene" should be --polyoxyalkylene glycol--.

Column 2, line 12: "centimetres" should be --centimeters--.

Column 9, line 16: "0,75 dl/g" and "0,65 dl/g" should be --0.75 dl/g-- and --0.65 dl/g--, respectively.

Column 9, line 39: "polycapromactam" should be --polycaprolactam--

Column 9, line 64: "dehydroxylated" should be --dihydroxylated--.

Signed and Sealed this

Fourth Day of November 19

[SEAL]

Attest:

SIDNEY A. DIAMOND

Attesting Officer

Commissioner of Patents and Tradema